(12) United States Patent
Lee et al.

(10) Patent No.: US 12,095,304 B2
(45) Date of Patent: Sep. 17, 2024

(54) POWER SUPPLY CIRCUIT AND POWER DISTRIBUTION METHOD THEREOF

(71) Applicant: PEGATRON CORPORATION, Taipei (TW)

(72) Inventors: Yi-Hsuan Lee, Taipei (TW); Liang-Cheng Kuo, Taipei (TW); Chun-Wei Ko, Taipei (TW); Ya Ju Cheng, Taipei (TW); Chih Wei Huang, Taipei (TW); Ywh Woei Yeh, Taipei (TW); Yu Cheng Lin, Taipei (TW); Yen Ting Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 451 days.

(21) Appl. No.: 17/516,358

(22) Filed: Nov. 1, 2021

(65) Prior Publication Data

US 2022/0224142 A1    Jul. 14, 2022

(30) Foreign Application Priority Data

Jan. 8, 2021    (TW) .................................. 110100861

(51) Int. Cl.
*H02J 7/00*    (2006.01)
(52) U.S. Cl.
CPC .............................. *H02J 7/007194* (2020.01)
(58) Field of Classification Search
CPC . H02J 7/007194; H02J 2207/20; H02J 7/0068
USPC ....................................................... 320/136
See application file for complete search history.

(56) References Cited

U.S. PATENT DOCUMENTS

| | | | | |
|---|---|---|---|---|
| 7,952,323 B2* | 5/2011 | Lamothe | ................. | H02J 50/20 |
| | | | | 320/108 |
| 9,065,277 B1* | 6/2015 | Kim | .......................... | H02J 7/02 |
| 9,716,403 B2* | 7/2017 | Ball | ................. | H02J 7/007182 |
| 10,013,036 B2* | 7/2018 | Luo | ................... | H02J 13/00002 |
| 10,389,144 B2* | 8/2019 | Jin | ......................... | H02J 7/0031 |
| 10,491,018 B2* | 11/2019 | Lai | ............................ | H02J 7/00 |
| 10,788,884 B2* | 9/2020 | Hanson | ................. | G06F 1/3287 |

(Continued)

FOREIGN PATENT DOCUMENTS

| | | |
|---|---|---|
| CN | 106329636 | 1/2017 |
| CN | 106532882 | 12/2018 |

(Continued)

*Primary Examiner* — M Baye Diao
(74) *Attorney, Agent, or Firm* — J.C. PATENTS

(57) ABSTRACT

A power supply circuit and a power distribution method thereof are provided. The power supply circuit includes a power input switch block, a power supply measurement block, a power supply conversion block and a power supply control block. The power input switch block provides a first power supply voltage to a load circuit based on an external power supply voltage from an adapter. The power supply measurement block measures a current of the first power supply voltage. The power supply conversion block is coupled to the battery module to provide a second power supply voltage to the load circuit. When a battery temperature of the battery module is higher than a critical temperature and a battery power of the battery module is higher than or equal to a critical power, the power supply control block limits the second power supply voltage provided to the load circuit.

16 Claims, 2 Drawing Sheets

(56) References Cited

U.S. PATENT DOCUMENTS

| | | | | |
|---|---|---|---|---|
| 11,366,172 B2* | 6/2022 | Choi | .................... | G01R 31/389 |
| 2007/0222417 A1* | 9/2007 | Kim | .................... | H05K 1/0254 |
| | | | | 320/134 |
| 2009/0001937 A1* | 1/2009 | Densham | ................. | H02J 7/02 |
| | | | | 320/145 |
| 2010/0301799 A1* | 12/2010 | Lin | ..................... | H01M 10/465 |
| | | | | 320/124 |
| 2012/0268074 A1* | 10/2012 | Cooley | ................. | H01M 10/39 |
| | | | | 320/167 |
| 2012/0286732 A1* | 11/2012 | Cruise | ................... | H01M 10/46 |
| | | | | 320/152 |
| 2013/0147433 A1 | 6/2013 | Chen et al. | | |
| 2013/0253720 A1* | 9/2013 | Luo | ................... | H02J 13/00002 |
| | | | | 700/295 |
| 2013/0257350 A1* | 10/2013 | Yen | ....................... | H01M 10/48 |
| | | | | 320/150 |
| 2014/0087215 A1* | 3/2014 | Kim | .................... | H01M 10/637 |
| | | | | 429/50 |
| 2015/0030901 A1* | 1/2015 | Bourgeois | ............ | H02J 7/0018 |
| | | | | 429/120 |
| 2017/0288427 A1* | 10/2017 | Lo | ....................... | H02J 7/00308 |
| 2018/0048171 A1* | 2/2018 | Lai | ....................... | H02J 7/0068 |
| 2019/0319466 A1* | 10/2019 | Pk | ..................... | H02J 7/007194 |
| 2020/0381922 A1* | 12/2020 | Masaoka | ................. | H02J 7/007 |
| 2021/0011089 A1* | 1/2021 | Choi | .................... | H01M 10/48 |
| 2022/0376540 A1* | 11/2022 | Liu | ....................... | H02J 7/0029 |

FOREIGN PATENT DOCUMENTS

| | | | | |
|---|---|---|---|---|
| CN | 112350425 A | * | 2/2021 | ................ H02J 9/06 |
| EP | 4068605 A1 | * | 10/2022 | .......... H01M 10/425 |
| TW | 201008077 | | 2/2010 | |
| TW | 201424197 | | 6/2014 | |

* cited by examiner

POWER SUPPLY CIRCUIT AND POWER DISTRIBUTION METHOD THEREOF

CROSS-REFERENCE TO RELATED APPLICATION

This application claims the priority benefit of Taiwan application no. 110100861, filed on Jan. 8, 2021. The entirety of the above-mentioned patent application is hereby incorporated by reference herein and made a part of this specification.

BACKGROUND

Technical Field

The disclosure relates to a power supply circuit, and in particular, to a power supply circuit configured for a battery module.

Description of Related Art

Generally, at a regular temperature or a room temperature, when an adapter supplies power to a load of a system in a portable electronic device, the adapter simultaneously charges a battery module through the system. When the battery module is fully charged, the battery module is in a steady state. As the temperature of the system is at a high temperature due to a state of use of a user or the environment, the battery module is in a high-temperature steady state. To prevent the fully-charged battery module from swelling and aging caused by the high temperature, conventionally, when a system software detects that the battery module in the system is at the high temperature, the system is forced to be switched to the battery operation mode. That is, the power supply is provided for the load of the system by the battery module. In this case, the battery module discharges the power and sustain the system consumption, and thus cause a voltage of the battery module to decrease.

When the system is forced to be switched to the battery operation mode, a power management icon of the desktop on the screen also accordingly displays that the battery module is discharging the power and the user mistakes that the adapter is damaged and may thus replace the adapter. Furthermore, since the system is operated in the battery mode, to decrease the power consumption of the battery module, the system may decrease a current load amount of the operation (e.g. a central processing unit (CPU) is throttling to run). Therefore, the operation efficiency of the system in the battery mode is compromised.

SUMMARY

The disclosure is directed to a power supply circuit and a power distribution method thereof in which when a temperature and a power of a battery module are too high, an operation mode and a power management icon of an electronic device are not changed but the power of the battery module may still be consumed.

The power supply circuit of the disclosure is adapted to be coupled to an adapter, a battery module, and a load circuit. The power supply circuit includes a power supply line, a power input switch block, a power supply conversion block, and a power supply control block. The power supply line is coupled to the load circuit. The power input switch block is coupled to the adapter and the power supply line. The power input switch block receives an external power supply voltage from the adapter to provide a first power supply voltage to the power supply line. The first power supply voltage is provided to the load circuit through the power supply line. The power supply control block is coupled to the battery module. The power supply control block is configured to measure a battery temperature and a battery power of the battery module. When the battery temperature of the battery module is higher than a critical temperature and the battery power of the battery module is higher than or equal to a critical power, the power supply control block provides a conversion control signal. The power supply conversion block is coupled to the power supply control block, the battery module, and the power supply line and receives the conversion control signal. The power supply conversion block controls the battery module to provide a second power supply voltage in response to the conversion control signal. The second power supply voltage is provided to the load circuit through the power supply line.

The power distribution method of the power supply circuit of the disclosure includes the following steps. Based on that the power supply circuit is connected to an adapter, a battery power of a battery module is measured through a power supply control block of the power supply circuit. Based on that the battery power of the battery module is higher than or equal to a critical power, a battery temperature of the battery module is measured through the power supply control block of the power supply circuit. Based on that the battery temperature of the battery module is higher than a critical temperature, a battery voltage of the battery module is converted into a power supply voltage to a load circuit through a power supply conversion block.

Based on the above, in the power supply circuit and the power distribution method thereof of the embodiment of the disclosure, when the temperature and the power of the battery module are too high, the power supply control block controls the adapter and the battery module to supply the power simultaneously so that the battery module and the adapter are connected in parallel to simultaneously supply the power to the load circuit of the electronic device. Accordingly, the operation mode and the power management icon of the electronic device are not changed, but the power of the battery module may still be consumed.

In order to make the aforementioned features and advantages of the disclosure comprehensible, embodiments accompanied with drawings are described in detail below.

DESCRIPTION OF THE EMBODIMENTS

To avoid a user mistaking that an adapter is damaged or replacing an adapter and to improve a user experience when a system is operated at a high temperature, a power supply distribution mechanism between the adapter back end and the system is adjusted. An adjustment is performed by using a current or an added set of a hardware voltage conversion line and a control circuit and applying an establishment of a control unit of system software.

When the system detects that a battery module in the system is in a high-temperature steady state and it is required to discharge a battery, a new power supply distribution mechanism activates a newly added system control unit to limit a power output to the system by the adapter. Furthermore, with regard to an unsatisfied part of a demand of an operation power of the system, a battery voltage may be boosted to be greater than or equal to an input voltage of the adapter through a power supply conversion circuit, and the converted battery voltage is connected to the adapter voltage in parallel.

When the power supplied to the system by the adapter is limited, the battery module supplies a small part of the power to the system to complement the power required for the system operation. Hence, the internal energy of the battery module may be consumed to lower the battery voltage. Furthermore, the new power supply distribution mechanism is not operated through a conventional battery discharging mode, instead, most of the power is output to the system by the adapter. Therefore, the operation efficiency of the system is not compromised. In addition, during a power discharging process of the battery module and the process of lowering the voltage, the system still detects that the adapter supplies the power, so the system state that the battery module continues returning is that the battery module is still fully charged (i.e. the power is 100%). Therefore, a power management icon of the desktop on the screen still displays that the adapter supplies the power, and the user is not aware that battery module abnormally discharges power.

According to the operation method above, a circuit operation of the system is further described below. The terms "a system" and "an electronic device" are used to describe the system of the disclosure and are interchangeable. They are not distinguished in particular below.

Figure 1:
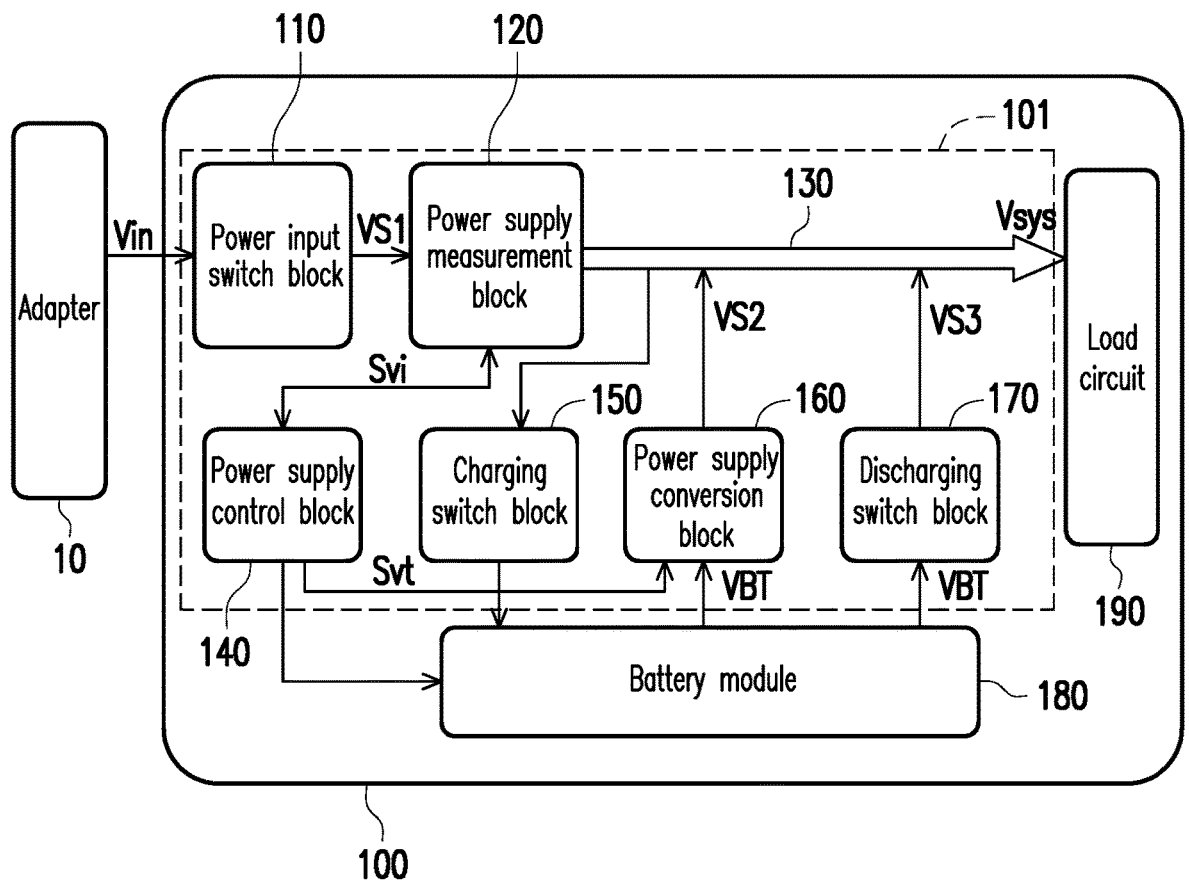
FIG. 1 is a schematic diagram of a system of an electronic device coupled to an adapter according to an embodiment of the disclosure.

FIG. 1 is a schematic diagram of a system of an electronic device coupled to an adapter according to an embodiment of the disclosure. Referring to FIG. 1, in the embodiment, an electronic device 100 may be coupled to an adapter 10 to receive an external power supply voltage Vin from the adapter 10. The electronic device 100 may be charged or operated by using the external power supply voltage Vin.

In the embodiment of the disclosure, the electronic device 100 includes a power supply circuit 101, a battery module 180, and a load circuit 190. The power supply circuit 101 is adapted to be coupled to the adapter 10, the battery module 180, and the load circuit 190. The power supply circuit 101 includes a power input switch block 110, a power supply measurement block 120, a power supply line 130, a power supply control block 140, a charging switch block 150, a power supply conversion block 160, and a discharging switch block 170.

The power input switch block 110 is configured to be coupled to the adapter 10 and the power supply line 130. The power input switch block 110 receives the external power supply voltage Vin (e.g. 19 volts) from the adapter 10 and provides a first power supply voltage VS1 through the power supply line 130 to the load circuit 190 according to the external power supply voltage Vin. The power supply line 130 is coupled to the load circuit 190 to provide a system power supply voltage Vsys to the load circuit 190. The first power supply voltage VS1 may be substantially equal to the external power supply voltage Vin. The power supply measurement block 120 is configured to measure a current of the first power supply voltage VS1 to provide a power supply indication signal Svi.

The power supply control block 140 is coupled to the power supply measurement block 120, the power supply conversion block 160, and the battery module 180. The power supply control block 140 measures a battery temperature and a battery power of the battery module 180. When the battery temperature of the battery module 180 is higher than a critical temperature (e.g. 45° C.) and the battery power of the battery module 180 is higher than or equal to a critical power (e.g. the power is 100%), the power supply control block 140 provides a conversion control signal Svt.

The power supply conversion block 160 is coupled to the power supply line 130, the power supply control block 140, and the battery module 180 and receives the conversion control signal Svt. The power supply conversion block 160 controls the battery module 180 to provide a second power supply voltage VS2 to the load circuit 190 through the power supply line 130 in response to the conversion control signal Svt. The second power supply voltage VS2 may be greater than or equal to the first power supply voltage VS1 (equal to the external power supply voltage Vin).

When the battery temperature of the battery module 180 is higher than the critical temperature (e.g. 45° C.) and the battery power of the battery module 180 is higher than or equal to the critical power (e.g. the power is 100%), the power supply control block 140 provides the conversion control signal Svt to the power supply conversion block 160. The power supply conversion block 160 controls the battery module 180 to provide the second power supply voltage VS2 to the load circuit 190 through the power supply line 130 in response to the conversion control signal Svt. The power supply control block 140 controls a power of the second power supply voltage VS2 provided to the power supply line 130 by the battery module 180 based on the power supply indication signal Svi. Accordingly, when the temperature and the power of the battery module 180 are too high, the adapter 10 and the battery module 180 may supply power simultaneously. That is, the battery module 180 and the adapter 10 are connected in parallel to supply the power simultaneously to the load circuit 190 of the electronic device 100. Therefore, an operation mode and a power management icon of the electronic device 100 are not changed, but the power of the battery module 180 may still be consumed.

The charging switch block 150 is coupled between the battery module 180 and the power supply line 130. When the charging switch block 150 is activated, the charging switch block 150 charges the battery module 180 by using the first power supply voltage VS1 (i.e. the current system power supply voltage Vsys). The charging switch block 150 is activated when the electronic device 100 is coupled to the adapter 10 and the battery power of the battery module 180 is lower than the critical power. The charging switch block 150 is deactivated when the battery power of the battery module 180 is higher than or equal to the critical power. The discharging switch block 170 is coupled between the battery module 180 and the power supply line 130. When the discharging switch block 170 is activated, a battery voltage VBT of the battery module 180 is converted into a third power supply voltage VS3 (e.g. 12.6 to 19 volts) to the power supply line 130. The discharging switch block 170 is activated when the electronic device 100 is not coupled to the adapter 10. An operation of the charging switch block 150 and an operation of the discharging switch block 170 may be independent from the power supply control block 140, which means that the charging switch block 150 and the discharging switch block 170 may not be controlled by the power supply control block 140.

In the embodiment of the disclosure, when the conversion control signal Svt is not provided, which means that the battery voltage VBT of the battery module 180 is not converted into the second power supply voltage VS2, only the first power supply voltage VS1 is provided to power supply line 130, which means that the system power supply voltage Vsys is substantially the same as the first power supply voltage VS1. Therefore, the current of the first power supply voltage VS1 (equal to the external power supply voltage Vin) is deemed a system total current corresponding to a load state of the load circuit 190 by the power supply control block 140. Furthermore, when the conversion control signal Svt is provided, which means that the battery voltage VBT of the battery module 180 is converted into the second power supply voltage VS2, the first power supply voltage VS1 and the second power supply voltage VS2 are simultaneously provided to the power supply line 130, which means that the current of the system power supply voltage Vsys is substantially equal to a total current of the first power supply voltage VS1 and the second power supply voltage VS2. Therefore, a supply time of the conversion control signal Svt may be determined based on a system total current required for the load state of the load circuit 190 and a present current of the first power supply voltage VS1 (equal to the external power supply voltage Vin).

Furthermore, the power supply control block 140 determines the current of the second power supply voltage VS2 based on the system total current and the present current of the first power supply voltage VS1, and a discharging time of the battery module 180 discharging power from the critical power to a security power is calculated as the supply time according to the current of the second power supply voltage VS2. The security power (e.g. the power is 80% to 90%) is less than the critical power (e.g. the power is 100%).

In addition, during a supply time when the second power supply voltage VS2 is supplied, when the battery temperature is lower than the critical temperature and the battery power is less than the critical power, the power supply control block 140 may stop providing the conversion control signal Svt, which means that the power supply control block 140 stops converting the battery voltage VBT into the power supply voltage.

In the embodiment of the disclosure, when the power input switch block 110 is coupled to the adapter 10 or receives the external power supply voltage Vin, the charging switch block 150 may be turned on and the discharging switch block 170 is turned off. When the power input switch block 110 is not coupled to the adapter 10 or does not receive the external power supply voltage Vin, the charging switch block 150 may be turned off and the discharging switch block 170 is turned on.

According to the above, in the embodiment of the disclosure, the power supply control block 140 is configured to manage a power source (including a power source of the adapter 10 and a power source of the battery module 180) supplied to the load circuit 190 of the electronic device 100. The power supply control block 140 activates a management mechanism at the timing when the following conditions are all satisfied: 1. The battery module in the electronic device 100 is in a high-temperature environment (e.g. 45° C.); 2. The battery module 180 is in a steady state in the electronic device 100 and is fully charged (i.e. the power is 100%); 3. The adapter 10 is coupled to the electronic device 100 and supplies the power to the load circuit 190.

When the power supply control block 140 activates the management mechanism, the power supplied to the load circuit 190 originally by the adapter 10 is simultaneously supplied to the load circuit 190 by double power sources of the external power supply voltage Vin of the adapter 10 and the battery voltage VBT connected in parallel. The power supply control block 140 simultaneously controls the power source of the adapter 10 and the power source of the battery module 180. The power sources of the adapter 10 and the battery module 180 are simultaneously supplied to the load circuit 190 at different rations. In addition, when the adapter 10 supplies the power to the load circuit 190, the power supply control block 140 also discharges some energy of the fully charged battery module 180 which is at the high temperature to the load circuit 190. Therefore, a security concern of the battery module 180 caused by the high temperature is avoided and the electronic device 100 functions normally without being affected by the high temperature.

Furthermore, the power source management mechanism of the power supply control block 140 functions as the following. When the power supply control block 140 detects that the temperature of the fully charged battery module 180 in the electronic device 100 is too high, a power supply measurement unit is activated first to measure and calculate a power currently consumed by the load circuit 190. Next, energy required to be discharged by the battery module 180 is calculated by the power supply control block 140 based on 100% power capacity specifications of the battery module 180 at a regular temperature (e.g. 20° C.) and a high temperature (e.g. 45° C.). Then, the power supply control block 140 controls the power supply conversion block 160 to boost the battery voltage VBT to be greater than or equal to the external power supply voltage Vin output by the adapter 10.

Furthermore, a power supply path of the battery module 180 and a power supply path of the adapter 10 are connected in parallel to generate a double power source framework connected in parallel, and a power output to the electronic device 100 by the adapter 10 is limited through the power supply control block 140 and the power supply measurement block 120. Power amounts supplied to the load circuit 190 of the electronic device 100 by the battery module 180 and the adapter 10 are simultaneously adjusted by the power supply control block 140. Last, the power supply control block 140 calculates the energy required to be discharged by the battery module 180 to estimate a time of the battery module 180 supplying the power to the load circuit 190. When the battery temperature decreases or the power of the battery module 180 reaches a security range limited in a battery specification, the power supply control block 140 is switched to a state in which only the adapter 10 supplies the power to the load circuit 190 through the power input switch block 110.

For example, a specification of the adapter 10 is 19V/60W, and the specification of the battery module 180 is a battery module with three batteries connected in series and one battery connected in parallel, a regular temperature capacity of 11.1V/6 Ah/66.6 Wh with 100% power, a high-temperature capacity of 11.1V/5.4 Ah/60 Wh with 100% power, and with the critical temperature, for example, 45° C. A conversion power of the battery module 180 may be calculated according to the equations (1) to (3):

$$P_{Batt,K} = P_{Total,K} - P_{total,k-1} \exp^{-\Delta T/\lambda} \quad (1)$$

$$\Delta T = T_{K-1} - T_H \quad (2)$$

$$Ut = \frac{Q_k - Q_{safe}}{P_{Batt,K}} \quad (3)$$

A discharging power $P_{Batt,K}$ of the battery module 180=a total consumption power $P_{total,K}$ of the load circuit 190–a power $P_{total,K-1}\exp^{-\Delta T/\lambda}$ of the adapter 10. $\lambda$, is a constant which is used to adjust a change amount of $\Delta T$. K represents a current state, and K−1 represents a previous measurement state. $\Delta T$=a current battery temperature $T_K$—a critical temperature $T_H$. When the battery temperature is higher, $\Delta T$ is greater, and it is more likely to limit a power provided by the adapter 10. A discharging time Ut of the battery module 180=(A current capacity $Q_k$—a set security capacity $Q_{safe}$)/a current discharging power $P_{Batt}$,K of the battery module 180.

Furthermore, assuming that when the battery temperature is measured 50° C., a discharging mechanism of the battery module 180 is activated. If a load amount required for a current operation of the electronic device 100 is 50W, it may be obtained from the equation 1: if $\lambda$, is set to 10, an output power provided to the electronic device 100 by the adapter 10 is limited to 30W and the rest of 20W is provided by the battery module 180. If the battery module 180 is fully charged, it may be obtained from the equation 2 that it takes approximately 19.8 minutes to discharge the battery module 180 to the security capacity, Ut=(66.6 Wh-60 Wh)/20 W=19.8.

Figure 2:
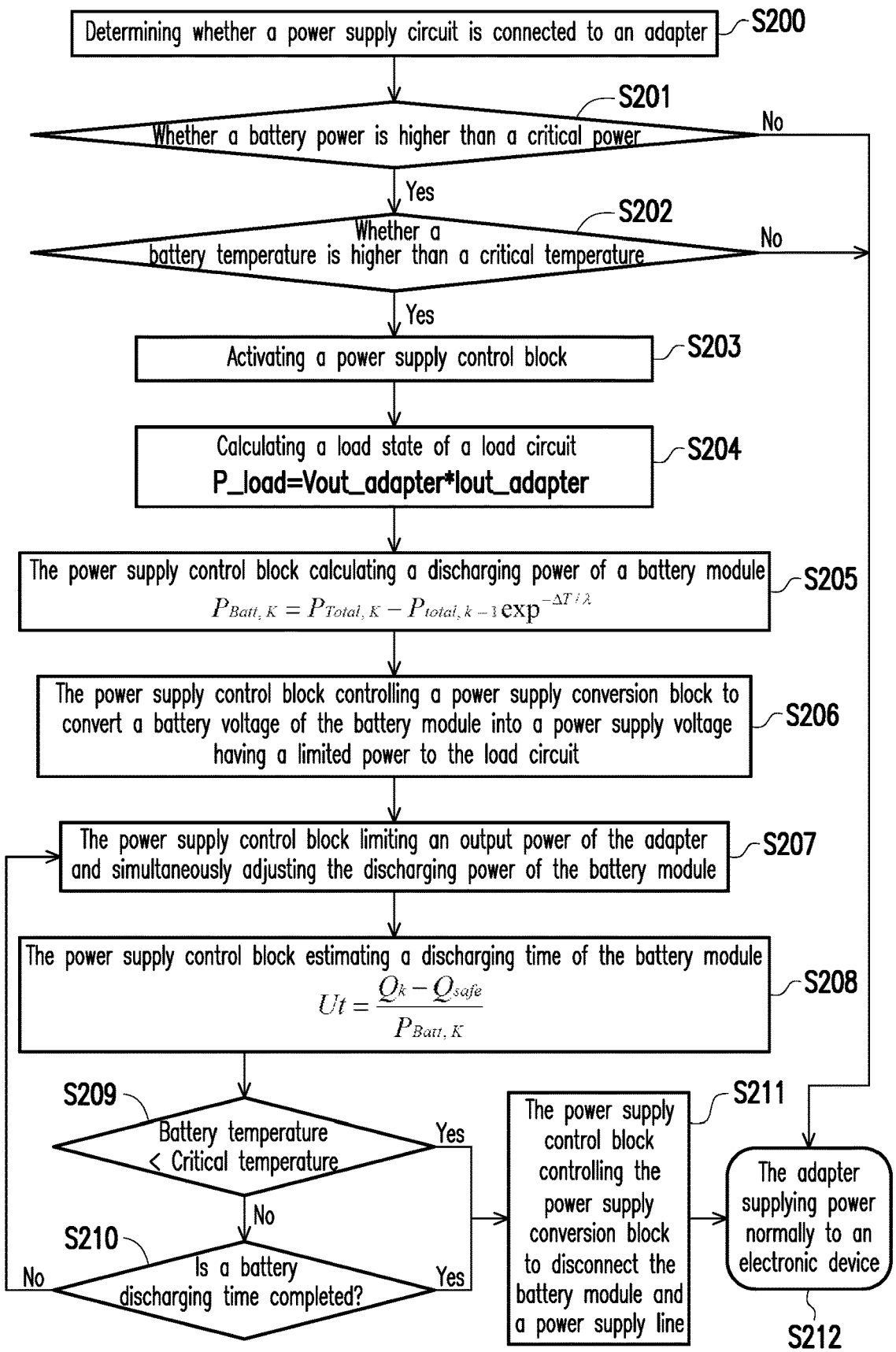
FIG. 2 is a flow chart of a power distribution method of a power supply circuit according to an embodiment of the disclosure.

FIG. 2 is a flow chart of a power distribution method of a power supply circuit according to an embodiment of the disclosure. Referring to FIG. 2, the power distribution method of the power supply circuit in the embodiment includes the following. In step S200, it is determined whether a power supply circuit is connected to an adapter. When the power supply circuit is connected to the adapter, in step S201, it is determined (or measured) whether a battery power of a battery module is higher than or equal to a critical power through a power supply control block. When the battery power of the battery module is not higher than or equal to the critical power, in step S212, the adapter supplies power normally to an electronic device. When the battery power of the battery module is higher than or equal to the critical power, in step S202, it is determined (or measured) whether a battery temperature of the battery module is higher than a critical temperature through the power supply control block of the power supply circuit.

When the battery temperature of the battery module is not higher than the critical temperature, in step S212, the adapter supplies the power normally to the electronic device. When the battery temperature of the battery module is higher than the critical temperature, in step S203, the power supply control block is activated. Next, in step S204, the power supply control block calculates a load state of a load circuit through a measurement of the power supply measurement block of the power supply circuit and a system total current required in the load state of the load circuit. That is, a power P_load of the load circuit=an output voltage Vout_adapter of the adapter x an output current Tout adapter of the adapter. In step S205, the power supply control block calculates a discharging power of the battery module. In step S206, the power supply control block controls a power supply conversion block to convert a battery voltage of the battery module into a power supply voltage having a limited power to the load circuit. In step S207, the power supply control block limits an output power of the adapter and simultaneously adjusts the discharging power of the battery module. In step S208, the power supply control block estimates a discharging time of the battery module.

Next, in step S209, it is determined (or measured) whether the battery temperature of the battery module is lower than or equal to the critical temperature through the power supply control block. When the battery temperature of the battery module is not lower than the critical temperature, in step S210, it is determined whether the discharging time of the battery module is completed through the power supply control block. When the battery temperature of the battery module is not lower than the critical temperature, in step S211, the power supply control block controls the power supply conversion block to disconnect the battery module and a power supply line. When the discharging time of the battery module is not completed, returning to step S207 to continue battery module discharging. When the discharging time of the battery module is completed, in step S211, the power supply control block controls the power supply conversion block to disconnect the battery module and the power supply line. After step S211, step S212 is executed. The sequence of steps S200 to S212 is for description, and the disclosure is not limited thereto. Furthermore, with regard to the details of steps S200 to S212, the embodiment of FIG. 1 may be referred to, and they are not repeated here.

In summary of the above, in the power supply circuit and the power distribution method thereof of the embodiment of the disclosure, when the temperature and the power of the battery module are too high, the power supply control block controls the adapter and the battery module to supply the power simultaneously so that the battery module and the adapter are connected in parallel to simultaneously supply the power to the load circuit of the electronic device. Accordingly, the operation mode and the power management icon of the electronic device are not changed, but the power of the battery module may still be consumed.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A power supply circuit adapted to be coupled to an adapter, a battery module, and a load circuit, comprising:
   a power supply line coupled to the load circuit;
   a power input switch block coupled to the adapter and the power supply line, wherein the power input switch block receives an external power supply voltage from the adapter to provide a first power supply voltage, the first power supply voltage is provided to the load circuit through the power supply line;
   a power supply control block coupled to the battery module, wherein the power supply control block is configured to measure a battery temperature and a battery power of the battery module, in response to the battery temperature of the battery module being higher than a critical temperature and the battery power of the battery module being higher than or equal to a critical power, the power supply control block provides a conversion control signal;
   a power supply conversion block coupled to the power supply control block, the battery module, and the power supply line and receiving the conversion control signal, wherein the power supply conversion block controls the battery module to provide a second power supply voltage in response to the conversion control signal, and the second power supply voltage is provided to the load circuit through the power supply line; and
   a power supply measurement block, wherein the power supply measurement block is coupled to the power input switch block, the load circuit, and the power supply control block, the power supply measurement block is configured to measure a current of the first power supply voltage to provide a power supply indication signal, and the power supply control block controls a power of the second power supply voltage based on the power supply indication signal, wherein, in response to the battery temperature of the battery module being lower than the critical temperature and the battery power of the battery module being less than the critical power, the current of the first power supply voltage is deemed a system total current corresponding to a load state of the load circuit by the power supply control block.

2. The power supply circuit according to claim 1, wherein the critical power is 100% of the battery power of the battery module.

3. The power supply circuit according to claim 1, wherein the second power supply voltage is greater than or equal to the first power supply voltage.

4. The power supply circuit according to claim 1, further comprising:
a charging switch block coupled to the battery module and the power supply line, wherein the charging switch block is activated to charge the battery module by using the first power supply voltage; and
a discharging switch block coupled to the battery module and the power supply line, wherein the discharging switch block is activated to convert a battery voltage of the battery module into a third power supply voltage, wherein the third power supply voltage is provided to the power supply line.

5. The power supply circuit according to claim 1, wherein, in response to the power supply control block providing the conversion control signal, a supply time of the conversion control signal is determined based on a system total current required for the load state of the load circuit and a present current of the first power supply voltage.

6. The power supply circuit according to claim 5, wherein the power supply control block determines a current of the second power supply voltage based on the system total current and the present current of the first power supply voltage, and a discharging time of the battery module discharging power from the critical power to a security power is calculated as the supply time according to the current of the second power supply voltage.

7. The power supply circuit according to claim 6, wherein the security power is less than the critical power.

8. The power supply circuit according to claim 5, wherein, during the supply time, in response to the battery temperature being lower than the critical temperature, the power supply control block stops providing the conversion control signal.

9. A power distribution method of a power supply circuit, comprising:
based on that a power supply circuit is connected to an adapter, measuring a battery power of a battery module through a power supply control block of the power supply circuit;
based on that the battery power of the battery module is higher than or equal to a critical power, measuring a battery temperature of the battery module through the power supply control block;
based on that the battery temperature of the battery module is higher than a critical temperature, converting a battery voltage of the battery module into a power supply voltage through a power supply conversion block, wherein the power supply voltage is provided to a load circuit; and
based on that the battery temperature is lower than the critical temperature, a current of an external power supply voltage of the adapter being deemed a system total current corresponding to a load state of the load circuit.

10. The power distribution method according to claim 9, wherein the critical power is 100% of the battery power of the battery module.

11. The power distribution method according to claim 9, wherein the power supply voltage is greater than or equal to an external power supply voltage of the adapter.

12. The power distribution method according to claim 9, further comprising:
based on that the battery temperature of the battery module is higher than the critical temperature, measuring a system total current required for a load state of the load circuit through a power supply measurement block of the power supply circuit, and the power supply conversion block providing the power supply voltage having a limited power based on the system total current.

13. The power distribution method according to claim 12, further comprising:
based on the system total current and a present current of an external power supply voltage of the adapter, determining a supply time of the battery voltage being converted into the power supply voltage.

14. The power distribution method according to claim 13, wherein determining the supply time of the battery voltage being converted into the power supply voltage comprises:
determining a current of the power supply voltage based on the system total current and the present current of the external power supply voltage through the power supply control block; and
calculating a discharging time of the battery module discharging power from the critical power to a security power as the supply time according to the current of the power supply voltage.

15. The power distribution method according to claim 14, wherein the security power is less than the critical power.

16. The power distribution method according to claim 13, further comprising:
during the supply time, based on that the battery temperature is lower than the critical temperature, stopping converting the battery voltage into the power supply voltage.

* * * * *